United States Patent
Thomas

(10) Patent No.: US 8,909,793 B2
(45) Date of Patent: *Dec. 9, 2014

(54) INTELLIGENT END USER DEVICES FOR CLEARINGHOUSE SERVICES IN AN INTERNET TELEPHONY SYSTEM

(75) Inventor: Stephen A. Thomas, Marietta, GA (US)

(73) Assignee: Transnexus, Inc., Atlanta, GA (US)

(*) Notice: Subject to any disclaimer, the term of this patent is extended or adjusted under 35 U.S.C. 154(b) by 73 days.

This patent is subject to a terminal disclaimer.

(21) Appl. No.: 13/452,907

(22) Filed: Apr. 22, 2012

(65) Prior Publication Data

US 2013/0107874 A1    May 2, 2013

Related U.S. Application Data

(63) Continuation of application No. 12/284,467, filed on Sep. 22, 2008, now Pat. No. 8,185,636.

(51) Int. Cl.
```
G06F 15/16    (2006.01)
H04L 29/06    (2006.01)
H04M 7/00     (2006.01)
H04M 7/12     (2006.01)
```

(52) U.S. Cl.
CPC ......... *H04M 7/0069* (2013.01); *H04L 65/1069* (2013.01); *H04L 65/1043* (2013.01); *H04L 63/0281* (2013.01); *H04L 63/0807* (2013.01); *H04L 65/104* (2013.01); *H04M 7/1285* (2013.01); *H04L 65/103* (2013.01); *H04L 29/06027* (2013.01)
USPC ........... 709/227; 709/204; 709/225; 709/226; 709/228; 709/229

(58) Field of Classification Search
CPC ............ H04L 65/1069; H04L 65/1043; H04L 63/0281; H04L 65/103; H04L 65/104; H04L 29/06027
USPC .................. 709/204, 225, 226, 227, 228, 229
See application file for complete search history.

(56) References Cited

U.S. PATENT DOCUMENTS

| | | | |
|---|---|---|---|
| 4,726,056 A | 2/1988 | An et al. | |
| 4,979,118 A | 12/1990 | Kheradpir | 364/436 |

(Continued)

FOREIGN PATENT DOCUMENTS

| | | |
|---|---|---|
| EP | 0 781 015 A2 | 6/1997 |
| EP | 0 824 295 A2 | 2/1998 |

(Continued)

OTHER PUBLICATIONS

ETSI, "*Telecommunications and Internet Protocol Harmonization Over Networks (TIPHON) Release 4; Open Settlement Protocol (OSP) for Inter-Domain pricing, authorization and usage exchange,*" ETSI TS 101 321, V4.1.1 (Nov. 2003) Technical Specification, pp. 49.

(Continued)

*Primary Examiner* — Liangche A Wang

(74) *Attorney, Agent, or Firm* — Smith Risley Tempel Santos LLC; Steven P. Wigmore

(57) ABSTRACT

Clearinghouse services architectures that support the use of end user devices, such as personal computers, Internet Protocol (IP) phones, cable multimedia terminal adapters, and residential gateways, in an Internet telephony system. The innovative architectures include a proxy-based system model, a direct communication model, and a hybrid proxy/direct communication model. A user can operate an "intelligent" end user device. i.e., a device running a client program with knowledge of the architecture particulars, to access a clearinghouse service on an IP network. This enables the user to communicate a telephony call over the IP network and via the combination of a terminating gateway identified by the clearinghouse service and the Public Switched Telephone Network.

20 Claims, 7 Drawing Sheets

(56) References Cited

U.S. PATENT DOCUMENTS

| | | | |
|---|---|---|---|
| 5,155,763 A | 10/1992 | Bigus et al. ............... 379/113 |
| 5,185,780 A | 2/1993 | Leggett ........................ 379/34 |
| 5,251,152 A | 10/1993 | Notess ........................ 364/550 |
| 5,325,290 A | 6/1994 | Cauffman et al. ........... 364/401 |
| 5,404,516 A | 4/1995 | Georgiades et al. ......... 395/650 |
| 5,408,465 A | 4/1995 | Gusella et al. ............... 370/17 |
| 5,434,848 A | 7/1995 | Chimento, Jr. et al. ....... 370/17 |
| 5,473,630 A | 12/1995 | Penzias et al. |
| 5,563,939 A | 10/1996 | La Porta et al. |
| 5,570,417 A | 10/1996 | Byers et al. |
| 5,581,544 A | 12/1996 | Hamada et al. ............. 370/253 |
| 5,600,794 A | 2/1997 | Callon ..................... 395/200.01 |
| 5,606,602 A | 2/1997 | Johnson et al. |
| 5,633,919 A | 5/1997 | Hogan et al. |
| 5,638,433 A | 6/1997 | Bubien, Jr. et al. |
| 5,668,955 A | 9/1997 | deCiutiis et al. |
| 5,675,636 A | 10/1997 | Gray |
| 5,712,907 A | 1/1998 | Wegner et al. |
| 5,740,361 A | 4/1998 | Brown ..................... 395/187.01 |
| 5,764,899 A * | 6/1998 | Eggleston et al. ........... 709/203 |
| 5,790,642 A | 8/1998 | Taylor et al. |
| 5,799,072 A | 8/1998 | Vulcan et al. |
| 5,867,495 A | 2/1999 | Elliott et al. ............... 370/352 |
| 5,892,753 A | 4/1999 | Badt et al. .................. 370/233 |
| 5,898,668 A | 4/1999 | Shaffer ...................... 370/230 |
| 5,898,673 A | 4/1999 | Riggan et al. ............... 370/237 |
| 5,917,891 A | 6/1999 | Will ........................... 379/88.03 |
| 5,917,897 A | 6/1999 | Johnson et al. |
| 5,917,902 A | 6/1999 | Saucier |
| 5,943,657 A | 8/1999 | Freestone et al. |
| 5,966,427 A | 10/1999 | Shaffer et al. |
| 5,991,373 A | 11/1999 | Pattison et al. ............. 379/93.17 |
| 5,995,554 A | 11/1999 | Lang ............................ 375/295 |
| 6,005,925 A | 12/1999 | Johnson et al. |
| 6,005,926 A | 12/1999 | Mashinsky |
| 6,049,531 A | 4/2000 | Roy |
| 6,067,287 A | 5/2000 | Chung-Ju et al. ........... 370/232 |
| 6,084,953 A | 7/2000 | Bardenheuer et al. |
| 6,085,238 A | 7/2000 | Yuasa et al. ................. 709/223 |
| 6,128,280 A | 10/2000 | Jamoussi et al. ............ 370/230 |
| 6,128,304 A | 10/2000 | Gardell et al. |
| 6,137,869 A | 10/2000 | Voit et al. ................... 379/114.01 |
| 6,157,648 A | 12/2000 | Voit et al. .................... 370/401 |
| 6,178,510 B1 * | 1/2001 | O'Connor et al. ............. 726/5 |
| 6,205,211 B1 | 3/2001 | Thomas et al. |
| 6,229,804 B1 | 5/2001 | Mortsolf et al. |
| 6,240,449 B1 | 5/2001 | Nadeau |
| 6,256,389 B1 * | 7/2001 | Dalrymple et al. .......... 370/352 |
| 6,259,691 B1 | 7/2001 | Naudus ........................ 370/352 |
| 6,263,051 B1 | 7/2001 | Saylor et al. ................ 379/88.17 |
| 6,275,490 B1 | 8/2001 | Mattaway et al. ........... 370/352 |
| 6,304,551 B1 | 10/2001 | Ramamurthy et al. ....... 370/232 |
| 6,310,873 B1 | 10/2001 | Rainis et al. ................. 370/356 |
| 6,317,490 B1 | 11/2001 | Cameron et al. |
| 6,330,311 B1 | 12/2001 | Mijares, Jr. et al. |
| 6,339,595 B1 | 1/2002 | Rekhter et al. ............... 370/392 |
| 6,345,090 B1 | 2/2002 | Walker et al. ............... 379/114.12 |
| 6,366,577 B1 | 4/2002 | Donovan ..................... 370/352 |
| 6,404,746 B1 | 6/2002 | Cave et al. ................... 370/352 |
| 6,426,955 B1 | 7/2002 | Gossett Dalton, Jr. et al. ............ 370/401 |
| 6,430,282 B1 | 8/2002 | Bannister et al. ............ 379/211.02 |
| 6,449,646 B1 * | 9/2002 | Sikora et al. ................ 709/226 |
| 6,459,708 B1 | 10/2002 | Cox et al. .................... 370/537 |
| 6,477,164 B1 | 11/2002 | Vargo et al. ................. 370/356 |
| 6,487,283 B2 | 11/2002 | Thomas et al. .............. 379/112.01 |
| 6,526,131 B1 | 2/2003 | Zimmerman et al. ........ 379/242 |
| 6,570,870 B1 | 5/2003 | Berstis ......................... 370/352 |
| 6,611,519 B1 | 8/2003 | Howe .......................... 370/428 |
| 6,614,781 B1 | 9/2003 | Elliott et al. ................. 370/352 |
| 6,615,264 B1 * | 9/2003 | Stoltz et al. .................. 709/227 |
| 6,615,349 B1 | 9/2003 | Hair ............................. 713/165 |
| 6,658,568 B1 | 12/2003 | Ginter et al. ................. 713/193 |
| 6,665,271 B1 | 12/2003 | Thomas et al. .............. 370/252 |
| 6,680,948 B1 | 1/2004 | Majd et al. ................... 370/401 |
| 6,687,877 B1 * | 2/2004 | Sastry et al. ................. 715/201 |
| 6,707,812 B1 | 3/2004 | Bowman-Amuah ......... 370/353 |
| 6,735,177 B1 | 5/2004 | Suzuki ......................... 370/238 |
| 6,751,652 B1 * | 6/2004 | Thomas ....................... 709/204 |
| 6,754,181 B1 | 6/2004 | Elliott et al. |
| 6,757,823 B1 | 6/2004 | Rao et al. ..................... 713/153 |
| 6,765,896 B1 | 7/2004 | Ahmed et al. ............... 370/338 |
| 6,795,867 B1 | 9/2004 | Ma et al. ...................... 709/227 |
| 6,829,243 B1 | 12/2004 | Sundhar |
| 6,996,093 B2 | 2/2006 | Dalton, Jr. et al. ........... 370/356 |
| 7,017,050 B2 | 3/2006 | Dalton, Jr. et al. ........... 713/201 |
| 7,099,301 B1 | 8/2006 | Sheu |
| 2003/0012178 A1 | 1/2003 | Mussman et al. ............ 370/352 |
| 2003/0095541 A1 | 5/2003 | Chang et al. ................. 370/352 |
| 2003/0193933 A1 | 10/2003 | Jonas et al. ................... 370/356 |
| 2004/0042606 A1 | 3/2004 | Zino et al. ................... 379/220.01 |

FOREIGN PATENT DOCUMENTS

| | | |
|---|---|---|
| EP | 0 948 164 | 10/1999 |
| GB | 2 301 264 | 11/1996 |
| WO | WO 97/14236 | 4/1997 |
| WO | WO 97/23078 | 6/1997 |
| WO | WO 98/18237 | 4/1998 |
| WO | WO 98/36543 | 8/1998 |
| WO | WO 98/37665 | 8/1998 |
| WO | WO 98/48542 | 10/1998 |
| WO | WO 99/11051 | 3/1999 |
| WO | WO 99/14931 | 3/1999 |
| WO | WO 99/14932 | 3/1999 |
| WO | WO 99/26153 | 5/1999 |
| WO | WO 00/48102 | 8/2000 |
| WO | WO 00/49551 | 8/2000 |
| WO | WO 00/52905 | 9/2000 |
| WO | WO 01/47232 A2 | 6/2001 |
| WO | WO 01/47235 A2 | 6/2001 |
| WO | WO 01/52476 A2 | 7/2001 |
| WO | WO 01/63820 A2 | 8/2001 |
| WO | WO 02/23854 A2 | 3/2002 |
| WO | WO 2005/089147 A2 | 9/2005 |
| WO | WO 2006/065789 A2 | 6/2006 |

OTHER PUBLICATIONS

Johannesson, Nils Olof, "*The ETSI Computation Model: A Tool for Transmission Planning of Telephone Networks*," IEEE Communications Magazine, Jan. 1997, pp. 70-79.

Netscape Communications Corporation, "*Introduction to SSL*," Oct. 9, 1998, [Retrieved from Internet May 19, 2004], http://developer.netscape.com/docs/manuals/security/sslin/contents.htm, pp. 12.

RSA Security Press Release, "*TransNexus Integrates Industry Leader RSA Security's BSAFE Encryption Software Into Its ClearIP$^{SM}$ Clearinghouse Solution*," Oct. 21, 1999, Abstract XP-002193409, www.rsasecurity.com.

Sin, Sam-Kit et al., "*A New Design Methodology for Optimal Interpolative Neural Networks with Application to the Localization and Classification of Acoustic Transients*," IEEE Conference on Neural Networks for Ocean Engineering, 1991, pp. 329-340.

TransNexus Home Page, Printed May 17, 2005, www.transnexus.com, 2 pp.

TransNexus Press Release, "*Agis and Popstar Introduce Profit-Generating Internet Fax Services to ISP Partners and Customers Worldwide*," Abstract XP-002193408, Jun. 24, 1999, www.transnexus.com, 3 pp.

Chaniotakis et al., "*Parlay and Mobile Agents in a Homogenized Service Provision Architecture*," IEEE; Universal Multiservice Networks; ECUMN 2002; 2$^{nd}$ European Conference on Apr. 8-10, 2002; pp. 150-154.

Liao, Wanjiun; "*Mobile Internet Telephony Protocol: An application layer protocol for mobile Internet telephony services*," Communications, 1999; ICC '99; 1999 IEEE International Conference; vol. 1, Jun. 6-10, 1999; pp. 339-343.

Maresca et al.; "*Internet Protocol Support for Telephony*," Proceedings of the IEEE, vol. 92, No. 9; Sep. 2004; pp. 1463-1477.

PCT International Preliminary Report dated Jan. 23, 2006 for International Application No. PCT/US01/28931.

(56) References Cited

OTHER PUBLICATIONS

Thom, "H323: The Multimedia Communications Standard for Local Area Networks," IEEE Communications Magazine, Dec. 1996, pp. 52-56.
Rudkin, et al., "Real-time Applications on the Internet," BT Technology Journal, vol. 15, No. 2, Apr. 1997, pp. 209-225.
The Ascend Max Voice Gateway, XP-002096239, "The asnet pipeline," www.asnet.co.nz/pipline/sum97/tamvg.html, Mar. 11, 1999.
Hansson, et al. "Phone Doubler—A step towards integrated Internet and telephone communities," Ericsson Review No. 4, 1997, pp. 142-151.
AT&T Communications, Adm. Rates and Tariffs, Tariff FCC No. 1, 3$^{rd}$ Revised p. 178.69.1.
Thom, "H.323: The Multimedia Communications Standard for Local Area Networks," IEEE Communications Magazine, Dec. 1996, pp. 52-56.
The Ascend Max Voice Gateway, XP-002096239, "The asnet pipeline," www.asnet.co.nz/pipeline/sum97/tamvg.html, Mar. 11, 1999.
Hansson, et al., "Phone Doubler—A step towards integrated Internet and telephone communities," Ericsson Review No. 4, 1997, pp. 142-151.

* cited by examiner

INTELLIGENT END USER DEVICES FOR CLEARINGHOUSE SERVICES IN AN INTERNET TELEPHONY SYSTEM

PRIORITY AND CROSS REFERENCE TO RELATED APPLICATION

This application claims priority under 35 U.S.C. §120 to and is a continuation of U.S. Non-Provisional application Ser. No. 12/284,467, filed on Sep. 22, 2008 now U.S. Pat. No. 8,185,636 and entitled, "INTELLIGENT END USER DEVICES FOR CLEARINGHOUSE SERVICES IN AN INTERNET TELEPHONY SYSTEM," the entire contents of which are hereby incorporated by reference.

FIELD OF THE INVENTION

The present invention is generally directed to intelligent end user devices for use with a clearinghouse service in an Internet telephony system. More specifically described, the present invention is directed to proxy-based, direct communication, and hybrid proxy/direct model architectures for clearinghouse services in an Internet telephony system supporting communications with intelligent end user devices.

BACKGROUND OF THE INVENTION

Internet telephony clearinghouse services have been designed and developed for telephony services (voice and facsimile) delivered by gateways—devices that bridge Public Switched Telephone Network (PSTN) and Internet Protocol (IP) networks. A typical call scenario is supported by the clearinghouse services architecture 100 of FIG. 1. A calling party communicates with an origination gateway 115 via a telephone handset 110 connected to the PSTN 105. The origination gateway 115 uses clearinghouse services at a service point 120 coupled to an IP network 125 to identify and obtain call authorization for one or more termination gateways 130. The origination gateway 115 can select one of the identified termination gateways 130 to accept the call communication from the calling party via the IF network 125. One of the identified termination gateways 130 can complete the call communication to the called party at the handset 110' via the PSTN 105.

A key characteristic of this architecture is that all access to the clearinghouse services relies on gateways. Gateway operators are the sole users of clearinghouse services; existing services are not visible to, or directly accessible by, end users.

There is a need to extend the clearinghouse architecture to support intelligent end user devices, such as personal computers, IP phones, cable multimedia terminal adapters, and residential gateways. A critical factor in such an expansion is ensuring that the resulting architecture is interoperable with existing clearinghouse services. That will give users of these devices access to existing networks for termination of their calls, and it will provide additional sources of traffic to existing networks.

SUMMARY OF THE INVENTION

Three different architectures can accommodate the addition of intelligent end user devices into clearinghouse service networks for an Internet telephony system—proxy-based services, direct communication, and a hybrid proxy/direct communication model.

The present invention provides a proxy-based system for supporting clearinghouse services for a client device in an Internet Protocol (IP) telephony system. The IP telephony system includes at least one client device, a proxy system, such as a proxy server, a service point supporting a clearinghouse service and one or more terminating gateways. Each component is coupled to an IP network, such as the global Internet. To initiate a call communication to a called party, a client application residing at the client device sends a call set-up request to a proxy server. The call set-up request typically comprises a called number for the call communication and user authentication information.

If the client application is a valid user of the services maintained at the proxy server, the proxy server transmits an authorization request to the clearinghouse service running on the service point. The authorization request typically comprises the called number and a call identifier assigned by the proxy server to the call communication.

If the proxy server is a valid user of the clearinghouse services, the service point transmits an authorization response to the proxy server via the IP network. The authorization response typically comprises the identity of one or more terminating gateways coupled to the IP network and available to deliver the call communication. This authorization response may also include an authorization token for each identified terminating gateway.

In response to the authorization response, the proxy server can select one of the terminating gateways to deliver the call communication. In turn, the proxy server transmits a call communication set-up request to the selected terminating gateway via the IP network. This set-up request typically comprises the called number, the call identifier, and the authorization token. If the proxy server is a valid user of the call delivery services of the selected terminating gateway, the selected terminating gateway completes call set-up operations and delivers the call communication to the Public Switched Telephone Network (PSTN).

The present invention provides a direct communication model for supporting clearinghouse services for a client device in an IP telephony system. The IP telephony system includes at least one client device executing an intelligent application program, a service point supporting a clearinghouse service and one or more terminating gateways. Each component is coupled to an IP network, such as the global Internet. The user can initiate a call via the client device by entering a telephone number to be called into the client program. In response, the client program can automatically initiate a communication with the clearinghouse service operating at the service point. For example, the client application can transmit an authorization request for a call communication to the clearinghouse service. The authorization request typically comprises a called number for the call communication and a call identifier assigned to the call communication.

If the client application is a valid user of the clearinghouse services, the service point transmits an authorization response to the client application via the IP network. The authorization response typically comprises (1) the identity of one or more terminating gateways coupled to the IP network and available to deliver the call communication and (2) an authorization token for each identified terminating gateway. In response, the client application can select one of the terminating gateways to deliver the call communication. Based on this selection of a terminating gateway, the client application prepares a call communication set-up request and transmits that request to the selected terminating gateway via the IP network. The set-up request typically comprises the called number, the call identifier, and the authorization token. If the client application is a valid user of the call delivery services of the selected terminating gateway, the gateway will deliver the call communication via the PSTN to the called number.

The present invention provides a hybrid proxy/direct communication model for supporting clearinghouse services for a client device in an IP telephony system. The IP telephony system includes at least one Web-enabled client device, a proxy system, such as a proxy server, a service point supporting a clearinghouse service and one or more terminating gateways. Each component is coupled to an IP network, such as the global Internet. To initiate a call communication, a client application running on the Web-enabled client device transmits a call set-up request to a proxy server. The call set-up request typically comprises a called number for the call communication and user authentication information.

If the client application is a valid user of the services maintained at the proxy server, then the proxy server transmits an authorization request to the clearinghouse service running on the service point. The authorization request typically comprises the called number and a call identifier assigned to the call communication. If the proxy server is a valid user of the clearinghouse services, the service point transmits an authorization response to the proxy server via the IP network. The authorization response typically comprises (1) the identity of one or more terminating gateways coupled to the IP network and available to deliver the call communication and (2) an authorization token for each identified terminating gateway.

In response to the authorization response, the proxy server can route the identity of each terminating gateway and each authorization token to the client application via the IP network. In turn, the client application can select one of the identified terminating gateways to support the completion of the call communication. Based on this selection of a terminating gateway, the client application sends a call communication set-up request to the selected terminating gateway via the IP network. The set-up request typically comprises the called number, the call identifier, and the authorization token. If the client application is a valid user of the call delivery services of the selected terminating gateway, the selected terminating gateway delivers the call communication to the called number via the PSTN.

DETAILED DESCRIPTION OF THE EXEMPLARY EMBODIMENTS

The present invention provides clearinghouse services architectures that support the use of intelligent end user devices, such as personal computers, Internet Protocol (IP) phones, cable multimedia terminal adapters, and residential gateways, in an Internet telephony system. By the use of the present invention, a user can operate an intelligent end user device to access a clearinghouse service on an existing IP network. This enables the user to communicate a telephony call over the IP network and via the combination of a terminating gateway and the Public Switched Telephone Network (PSTN). The present invention supports three separate architectures, namely a proxy-based system model, a direct communication model, and a hybrid proxy/direct communication model. Each of the clearinghouse architectures will be described in more detail below in connection with the illustrations shown in FIGS. 2-7.

Proxy-Based Model

End user devices can be incorporated into a clearinghouse service architecture through proxy systems. Proxy-based services interpose a proxy system between an end user device and a terminating gateway. Proxy systems typically include H.323 gatekeepers, Session Initiation Protocol (SIP) proxy servers, and proprietary devices.

A proxy-based model is fundamentally the same architecture as the existing phone-to-phone architecture; proxy-based architectural elements have exact analogs in the phone-to-phone case:

| Phone-to-Phone | Proxy-Based End User Devices |
| --- | --- |
| Calling party's telephone | end user device |
| PSTN from calling party to originating gateway | network from end user device to proxy |
| Originating gateway | proxy system |

Figure 1:
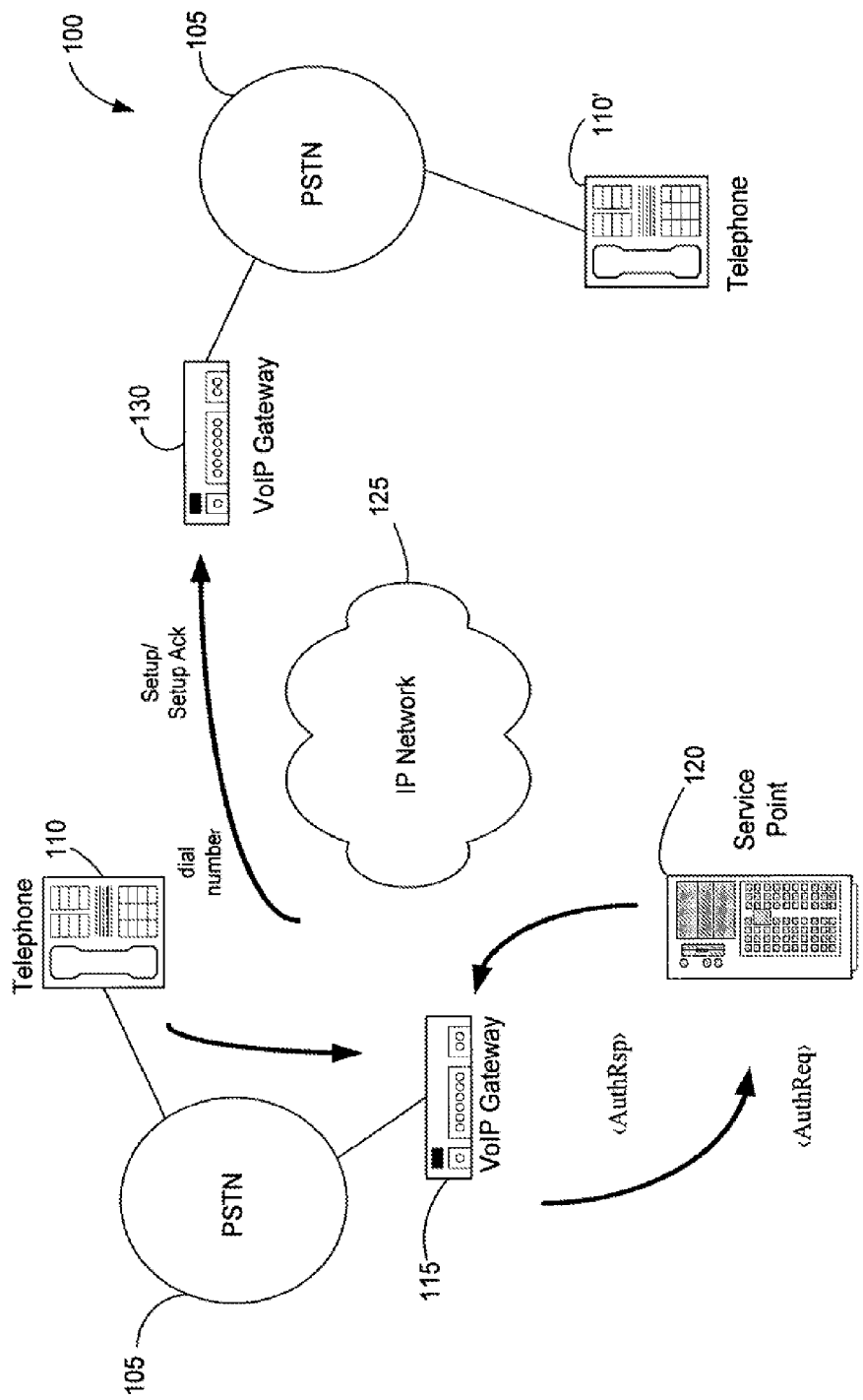
FIG. 1 is a block diagram illustrating a clearinghouse service architecture for an Internet telephony system including origination and termination gateways coupled to an Internet Protocol (IP) and the Public Switched Telephone Network (PSTN).
Figure 2:
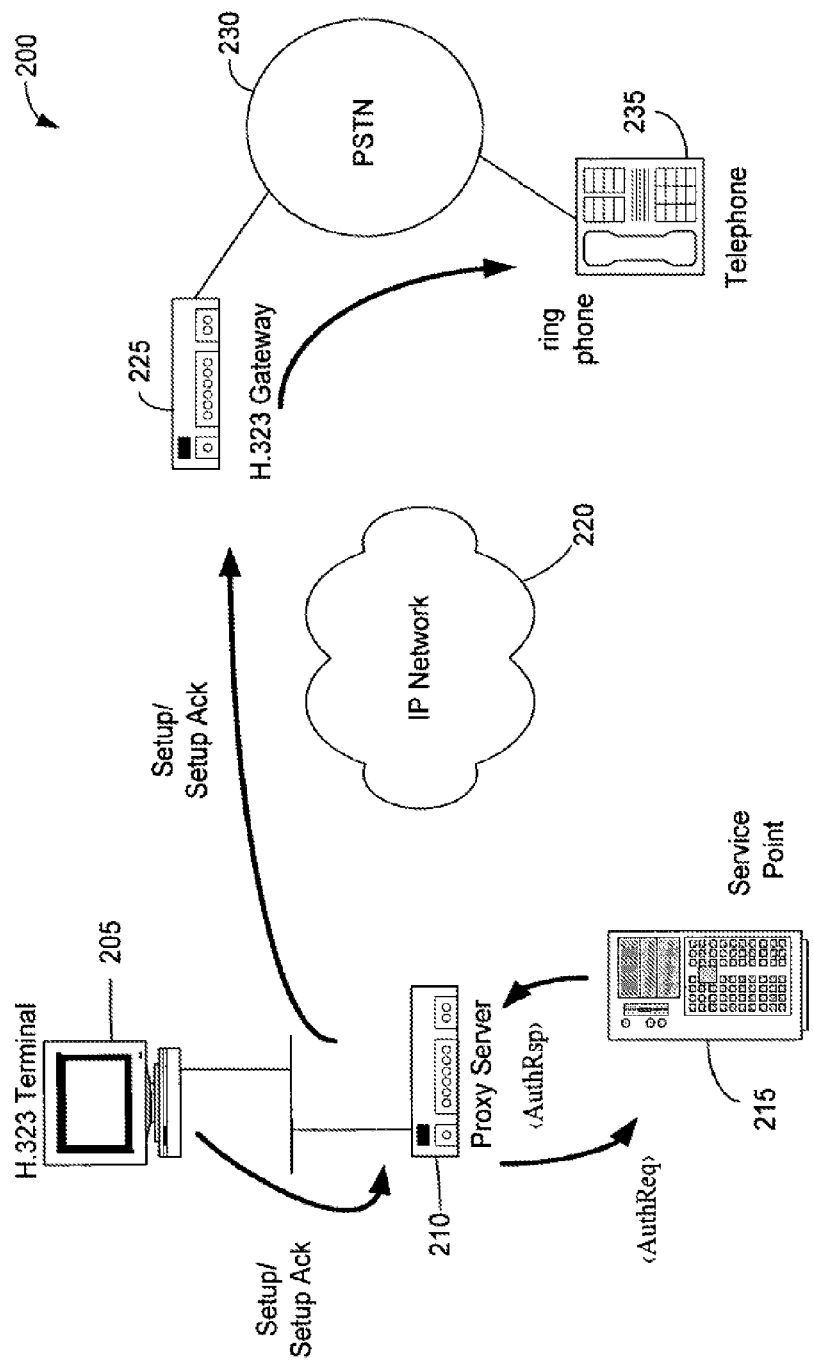
FIG. 2 is a block diagram illustrating a proxy-based architecture for a clearinghouse service in an EP telephony system constructed in accordance with an exemplary embodiment of the present invention.

The call scenario of FIG. 2 shows a representative example of proxy-based services in which the proxy system is gatekeeper compatible with the H.323 protocol. The operator of the proxy system is equivalent to the operator of an originating gateway. The key to this model is the existence of appropriate proxy systems. The proxy must interoperate with the clearinghouse service and be able to enroll with a clearinghouse service operator. The proxy must interoperate with terminating gateways. The proxy should not employ an interoperable call signaling protocol; instead, it must convey authorization tokens in an interoperable manner. The proxy must intemperate with end user devices. The protocol between end user devices and the proxy need not be the same as the protocol between the proxy and terminating gateways. Although the exemplary example of FIG. 2 illustrates an H.323 protocol implementation in both legs, end user devices could use SIP, or even a proprietary protocol to communicate with the proxy system.

The proxy-based architecture 200 shown in FIG. 2 comprises an intelligent end-user device, such as the H.323 terminal 205, for communicating to a a proxy server 210 via the IP network 220. For the example shown in FIG. 2, the proxy server is implemented as an H.323 protocol-compatible gatekeeper 210 capable of communicating with a service point 215 and a terminating gateway, such as the H.323 protocol-compatible gateway 225, via the IP network 220. Although FIG. 2 shows only a single terminating gateway, those skilled in the art will appreciate that proxy-based architecture 200 can include multiple terminating gateways capable of communicating with a proxy server. The service point 215 supports clearinghouse services for the Internet telephony system by providing the proxy server 210 with both authorization information and a list identifying one or more terminating gateways for accepting an incoming call from the user of the terminal 205. Each terminating gateway 225 is coupled to the PSTN 230 to support the communication of an incoming call from the proxy server 210 to a called party at a telephone handset 235.

The terminal 205 supports the operation of a client application that is configured to communicate with the proxy server 210 via the IP network 220. To initiate an outgoing call to a called party, the user can enter the telephone for the called party at the client application operating on the terminal 205. In response, the terminal 205 transmits call-related information, including the called number, to the gatekeeper 210. The call-related information can include end-user authorization information and authentication information to support a determination of whether the user is authorized to complete an Internet telephony call via the proxy server 210. The proxy server 210 completes the user validation task and, based upon validation of the user, transmits an authorization request to the service point 215 via the IP network 220. This authorization request initiates a clearinghouse service operation by the service point 215. The authorization request typically includes the called number and a call identifier to support a secure identification of the proxy server 210 as an authorized user of the clearinghouse service maintained by the service point 215.

In response the to authorization request, the service point 215 determines whether the proxy server 210 is an authorized user of the clearinghouse services. If so, the service point 215 identifies each terminating gateway 225 that can accept the call to the called party from the calling party at the terminal 205. In turn, the service point 215 can transmit an authorization response to the proxy server 210 via IP Network 220. The authorization response typically comprises the identity of each available terminating gateway and an authorization token for each identified terminating gateway. The identity of each terminating gateway is typically the IP address for the gateway.

In response to the authorization response, the proxy server 210 can select an identified terminating gateway 225 and set-up a call for handling by the selected terminating gateway. The set-up operation is typically completed by the proxy server 210 as an H.323 protocol set-up task and includes a communication comprising the call identifier, the authorization token for the identified terminating gateway and the called number. Although the proxy-based architecture shown in FIG. 2 is compatible with the H.323 protocol, it will be appreciated that the SIP protocol can be used to support communications by the proxy server 210 with the service point 215 and each terminating gateway 225.

The proxy server 210 initiates the set-up operation by sending a set-up request to the selected terminating gateway 225. The selected terminating gateway 225 will process the set-up information, including the call identifier, the authorization token, and the called number, to determine whether to accept completion of the call. The selected terminating gateway 225 will determine whether the authorization token is valid and has been issued by a known and verified clearinghouse service. In addition, the selected terminating gateway 225 will determine whether the authorization token has expired or remains within the time period authorized for completion of the call. The selected terminating gateway 225 also will determine whether the call number and the call identifier match the call information contained in the authorization token issued by the clearinghouse service. Based upon a positive response to this set of queries, the selected terminating gateway 225 will respond to the set-up communication by issuing an set-up acknowledgment to the proxy server 210. The selected terminating gateway 225 will decline the processing of the call based upon a determination that the call information forwarded by the proxy server 210 is invalid.

In response to issuing the set-up acknowledgement, the terminating gateway 225 will complete the call communication to the called umber via PSTN 230: When the call is terminated by the called party at the telephone handset 235, the selected terminating gateway 225 can report the call duration to the clearinghouse service operating at the service point 215 via IP network 220. The service point 215 can confirm receipt of the call usage information by sending a confirmation message to the selected terminating gateway 225.

To complete a call in the proxy-based architecture illustrated in FIG. 2, the client application operating on the terminal 205 can accept a called a number from an end-user and can communicate with a gatekeeper, such as the proxy server 210, via the IP network 220. The proxy server 210 can handle all call-related communication with the clearinghouse service maintained at the service point 215 and call processing operations with a select gateway 225. In essence, the proxy server 210 operates as a proxy for the client application at the terminal 205 by supporting all communications with the service point 215 and selected gateway 225.

Figure 3:
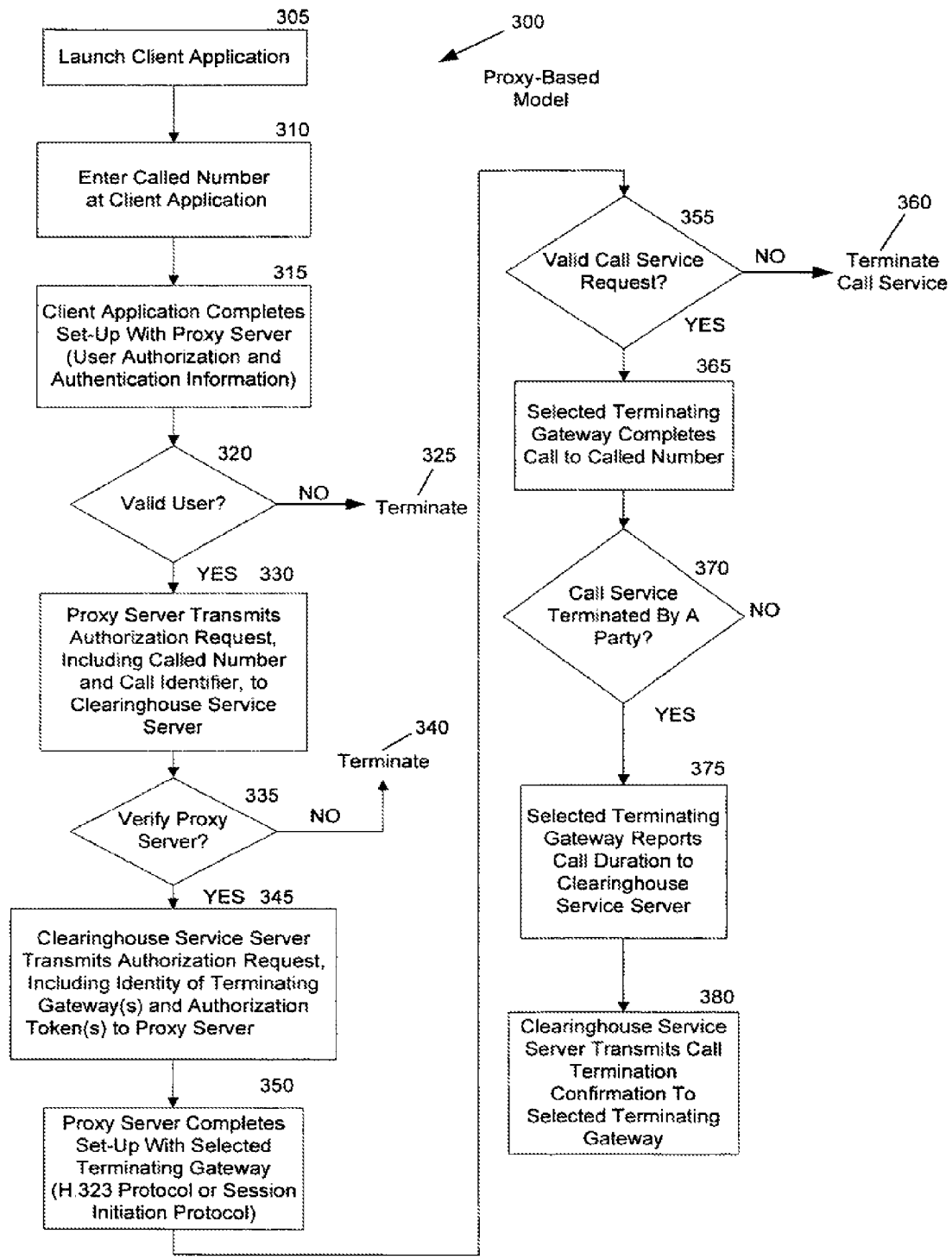
FIG. 3 is a logical flow chart diagram illustrating the computer-implemented steps of a proxy-based process for an IP telephony system in accordance with an exemplary embodiment of the present invention.

FIG. 3 is a logical flow chart diagram illustrating the exemplary steps completed by a proxy-based clearinghouse service for an Internet telephony system. Turning now to FIG. 3, the proxy-based process 300 is initiated at step 305 in response to the user launching the client application at a terminal. The client application is configured to communicate with a proxy server via the IP network. For example, the client application can be implemented by the "NET MEETING" software program marketed by Microsoft Corporation of Redmond, Wash. In step 310, the user can enter into the client application a telephone number for a party to be called via the IP network. The user typically enters the called number into the client application by completing a form or a web page presented to the user at the terminal 205.

In step 315, the client application completes a set-up operation with the proxy server by communicating user authorization and authentication information to the proxy server via the IP network. Typical information includes a password assigned to the end-user, namely the calling party, and call payment information, such as a calling card number. The client application is preferably programmed to complete transmission of set-up to the proxy server without manual assistance by the end-user.

In step 320, represented by the client application, the proxy server completes an inquiry to determine whether the calling party is a valid user of the calling services at the proxy server. If the response to the inquiry is negative, the "NO" branch is followed from step 320 to step 325 and the call is terminated. Otherwise, the "YES" branch is followed to step 330. The proxy server transmits in step 330 an authorization request to a clearinghouse service server, such as a service point coupled to the IP network. The authorization request typically includes the called number and the call identifier.

In step 335, the clearinghouse service server responds to the authorization request by completing a determination of whether the proxy server is valid and authorized to access the clearinghouse services maintained at the service point. If the proxy server is not authorized to access the services, the call is terminated at step 340. A positive response to the inquiry in step 335 results in the clearinghouse service server transmitting an authorization response to the proxy server in step 345. The authorization response typically includes an identity of one or more terminating gateways to handle the call from the end-user. In addition, the authorization response can include an authorization token for each identified terminating gateway.

The clearinghouse service server supports clearinghouse services for an Internet telephony system and is further described in a pending U.S. patent application assigned to the assignee of the present application, Ser. No. 09/154,564 entitled "Internet Telephone Call Reporting Engine" filed on Sep. 16, 1998. The subject matter of the '564 application is hereby fully incorporated within by reference.

In step 350, the proxy server selects one of the identified terminating gateways and completes a set-up operation with a selected terminating gateway. The set-up request issued by the proxy server typically comprises a call identifier, an authorization token for the selected terminating gateway, and the called number. The set-up communications between the proxy server and the selected terminating gateway can be compatible with the H.323 protocol, the SIP protocol, or other known protocols.

In step 355, the selected terminating gateway responds to the set-up request by completing a set-up operation to determine whether the proxy server is valid and has proper access to the services maintained by the terminating gateway. For example, the terminating gateway determines whether the authorization token has been issued by a known and valid clearinghouse service and is within the expiration period for a call communication. In addition, the selected terminated gateway can compare the called number and the call identifier to information maintained in the authorization token to determine whether the call-related information is valid. If the response to the inquiry in step 355 is negative, the "NO" branch is followed to 360 and the call is not accepted by the selected terminating gateway. If, on the other hand, the response to the inquiry in step 355 is positive, the "YES" branch is followed to step 365 and the terminating gateway issues a set-up acknowledgement to the proxy server. The selected terminating gateway also processes the call to the called number via the PSTN for communication to the called party.

In step 370, the selected terminating gateway determines whether the call has been terminated by a called or calling party. If the response to the inquiry in step 370 is negative, the "NO" branch loops back to step 370 to initiate the monitoring task again. If call service has been terminated, "YES" branch is followed from step 370 to step 375. The selected terminating gateway in step 375 reports the call duration to the clearinghouse service server via the IP network. In response, the clearinghouse service server transmits in step 780 a call termination confirmation to the selected terminating gateway via the IP network. This supports the proper invoicing of a party responsible for payment of the call service supported by the proxy-based architecture for a clearinghouse service in an Internet telephony network.

Direct Communication Model

The direct communication model eliminates the need for a proxy system by enabling end user devices to communicate directly with terminating gateways. In effect, the end user device acts as the combination of an originating gateway and calling user's telephone.

The direct communication model requires that end user devices themselves are interoperable with the clearinghouse services (and with terminating gateways). End user devices must be able to enroll with a clearinghouse service. Although this requirement is feasible for end user devices based on personal computer platforms, it may be problematic for other devices. Simple clients (such as PDAs, for example), however, may not have the processing power to efficiently implement the cryptographic components of a clearinghouse service.

Unlike proxy-based services, the direct communication model results in end users becoming customers of clearinghouse services. The sales, marketing, and support issues of this approach may be accommodated through a third-party sales agent. Other aspects are more fundamental, however, as this model can significantly increase both the number of customers and the number of enrolled devices, while at the same time reducing the average transaction volume per customer and per device.

Figure 4:
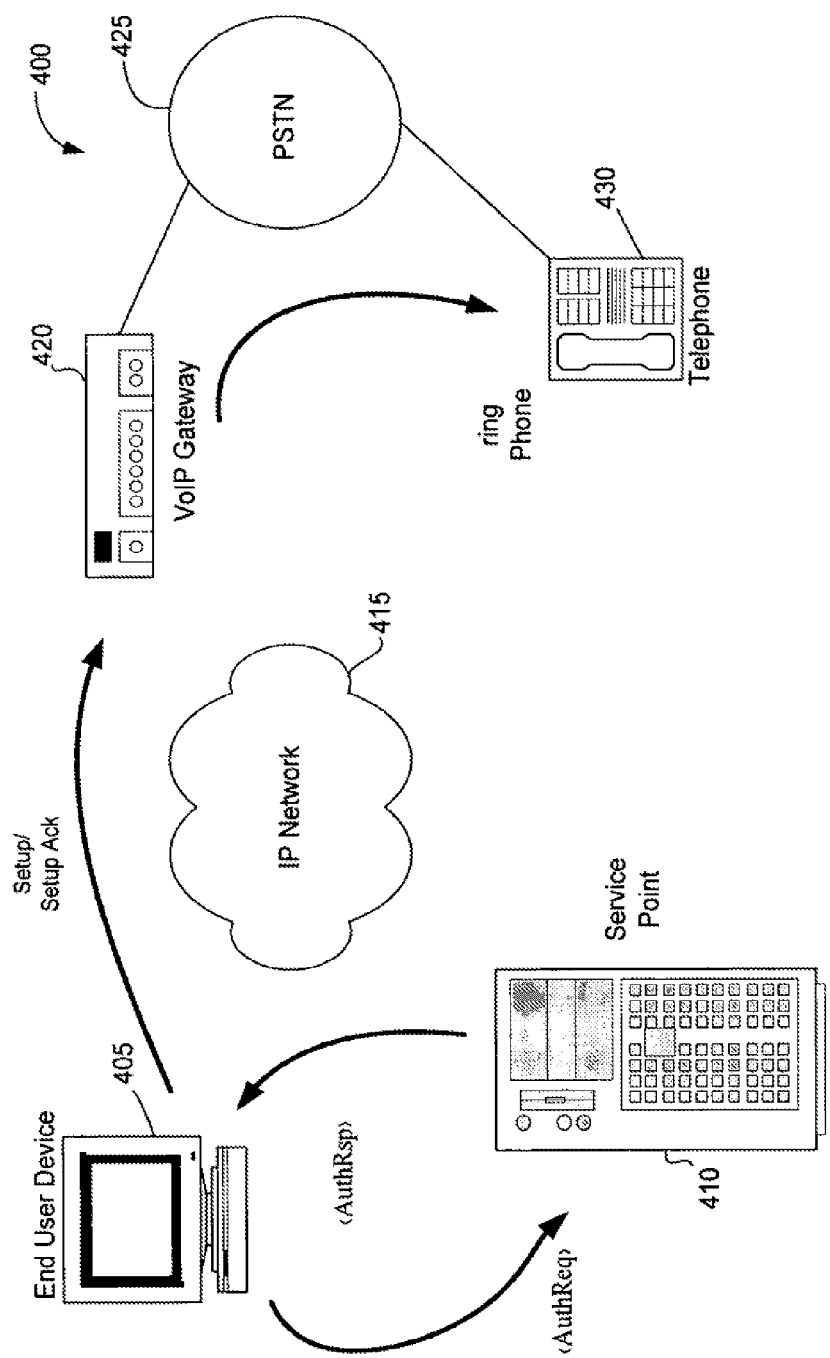
FIG. 4 is a block diagram illustrating a direct communication architecture for a clearinghouse service in an IP telephony system constructed in accordance with exemplary embodiment of the present invention.

FIG. 4 illustrates the direct communication architecture for a clearinghouse service in an Internet telephony system constructed in accordance with an exemplary embodiment of the present invention. Turning now to FIG. 4, an end user device 405 can communicate directly with a clearinghouse service maintained at a service point 410 via an IP network 415. In response to call-related information provided by the service point 410, the end user device 405 can communicate with an identified gateway 420 to support the communication of a telephony call via the IP network 415. If the terminating gateway determines that the calling party at the end user device 405 is a valid user of its call handling services, the gateway 420 can communicate the call to the called party at a telephone handset 430 via the PSTN 425.

For the direct communication architecture shown in FIG. 4, the end user device 405 operates in a manner similar to a source gateway of a conventional Internet telephony system. For example, the application program operating on the device 405 can accept a telephone number to be called and issues an authorization request to the service point 410 to initiate clearinghouse service operations. This authorization request typically comprises both the called number and a call identifier to support a verification of the end user by the clearinghouse service. If the clearinghouse service determines that the device 405 is authorized to access its services, the service point 410 can transmit an authorization response to the client program at the device 405 via the IP network. The authorization response typically comprises an identity of one or more available terminating gateways and an authorization token for each identified terminating gateway.

The client program operating at the device 405 can select a terminating gateway for handling the call and issues a set-up request to that selected gateway via the IP network 415. This set-up request and the corresponding response by the selected terminating gateway can be implemented by the H.323 protocol or the SIP protocol. If the selected terminating gateway 420 determines that the application program at the device 405 is an authorized user of its services, the terminating gateway will issue a set-up acknowledgment message to the device 405 via the IP network 415. In turn, the selected terminating gateway 420 can communicate the call to the called party at the telephone handset 430 via the PSTN 425.

Figure 5:
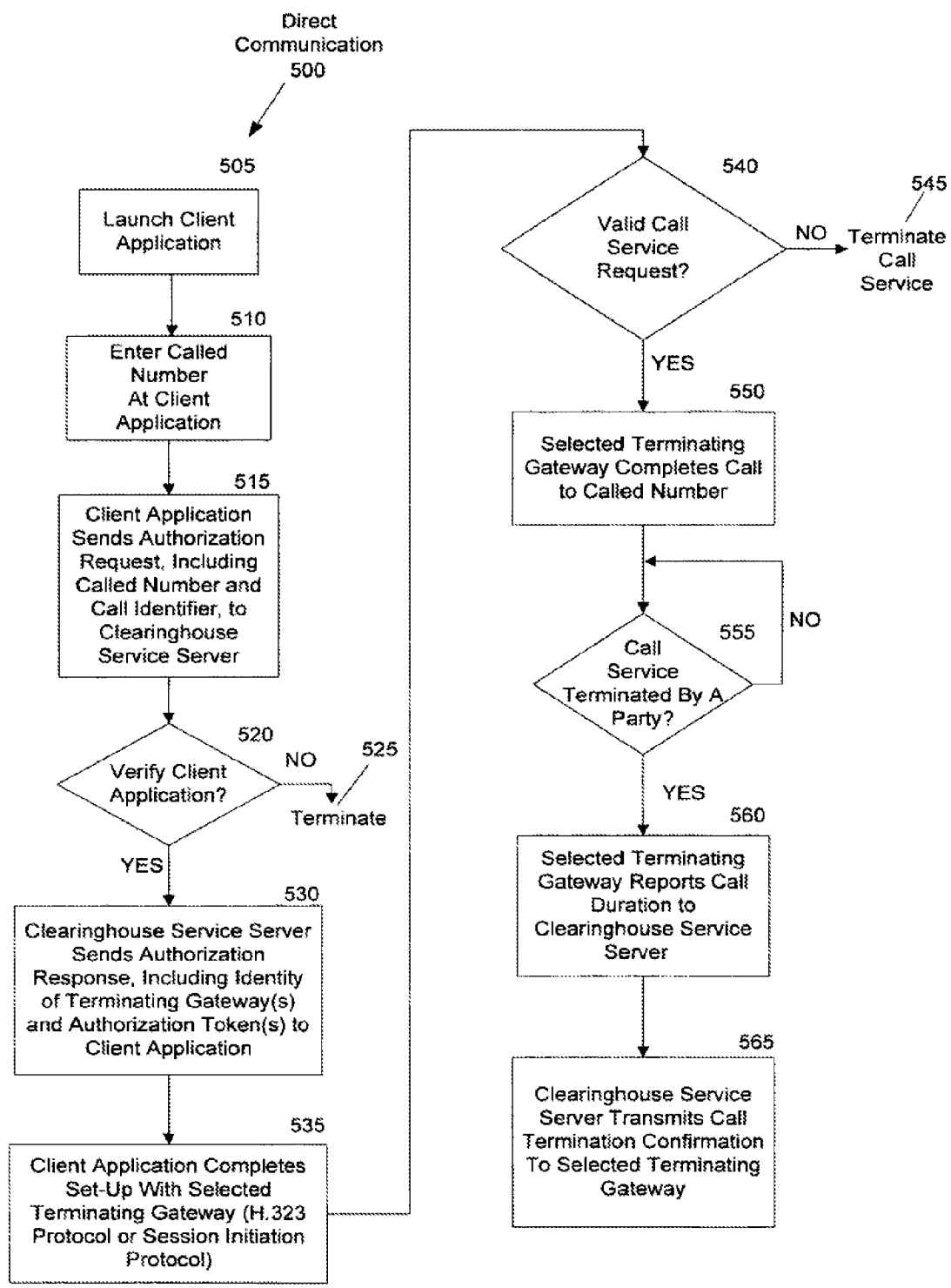
FIG. 5 is a logical flow chart diagram illustrating the computer-implemented steps of a direct communication process for a clearinghouse service for an IP telephony system in accordance with exemplary embodiment of the present invention.

FIG. 5 is a logical flow chart diagram illustrating a direct communication process for a clearinghouse service in an Internet telephony network in accordance with an exemplary embodiment of the present invention. Turning now to FIG. 5, a direct communication process 500 is initiated at step 505 in response to launching a client application at an end user device coupled to the IP network. The calling party can enter a called number into the client application at step 510. The user typically accomplishes the entry of the number to be called by entering a telephone number into a form or Web page presented by the client application at the end user device. In response to entry of the called number, the client application can send an authorization request to a clearinghouse service server operating as a service point on the IP network. The authorization request typically comprises the called number and a call identifier to support a determination by the clearinghouse service of whether the client application is authorized to access its services.

An inquiry is conducted by the clearinghouse service server in step 520 to determine whether the client application is valid and authorized to access the clearinghouse services. If the response to this inquiry is negative, the "NO" branch is followed from step 520 to step 525. The call service is terminated by the clearinghouse service server in step 525. If, on the other hand, the response to the inquiry in step 520 is positive, the "YES" branch is followed from step 520 to step 530. The clearinghouse service server transmits an authorization response in step 530 to the client application residing at the end user device via the IP network. The authorization response typically includes an identification of one or more available terminating gateways and an authorization token for each terminating gateway.

In response to the authorization response, the client application can select one of the identified terminating gateways to process the call on behalf of the end user. The client application completes the selection of the terminating gateway in step 535 based upon the list of available terminating gateways identified by the clearinghouse service server. The client application also issues in step 535 a set-up request to the selected terminating gateway to initiate the call processing operation. The set-up request can be formatted as an H.323-compatible or a SIP request. The set-up request typically comprises the call identifier, the authorization token for the selected terminating gateway and the called number.

In step 540, the selected terminating gateway determines whether the client application is valid and authorized to access its call handling services. The validation process typically includes a determination of whether the authorization token has been issued by a known and valid clearinghouse service and whether the authorization token is within the expiration period. In addition, the terminating gateway can complete a comparison of the called number and the call ID to the authorization token to determine whether the call-related information matches content encoded within the authorization token. If the response to the inquiry in step 540 is negative, the "NO" branch is followed to step 545 and the terminating gateway terminates all call-related operations. If, on the other hand, the response to the inquiry in step 540 is positive, the terminating gateway can initiate a call to the called number via the PSTN in step 550.

In step 555, the selected terminating gateway conducts a monitoring operation to determine whether the call has been terminated by one of the parties to the call. If not, the "NO" branch is followed from step 555 to step 550 to begin the monitoring process anew. If the call has been terminated, the "YES" branch is followed from step 555 to step 560. The selected terminating gateway reports the call duration to the clearinghouse service server in step 560. The clearinghouse service server can confirm termination of the call by sending a usage confirmation message to the selected terminating gateway via the IP network.

Hybrid Proxy/Direct Communication Model

A third architectural model for end user devices combines aspects from both proxy-based and direct communications approaches. This hybrid model relies on a proxy system, but allows the end user device to contact terminating gateways directly.

Figure 6:
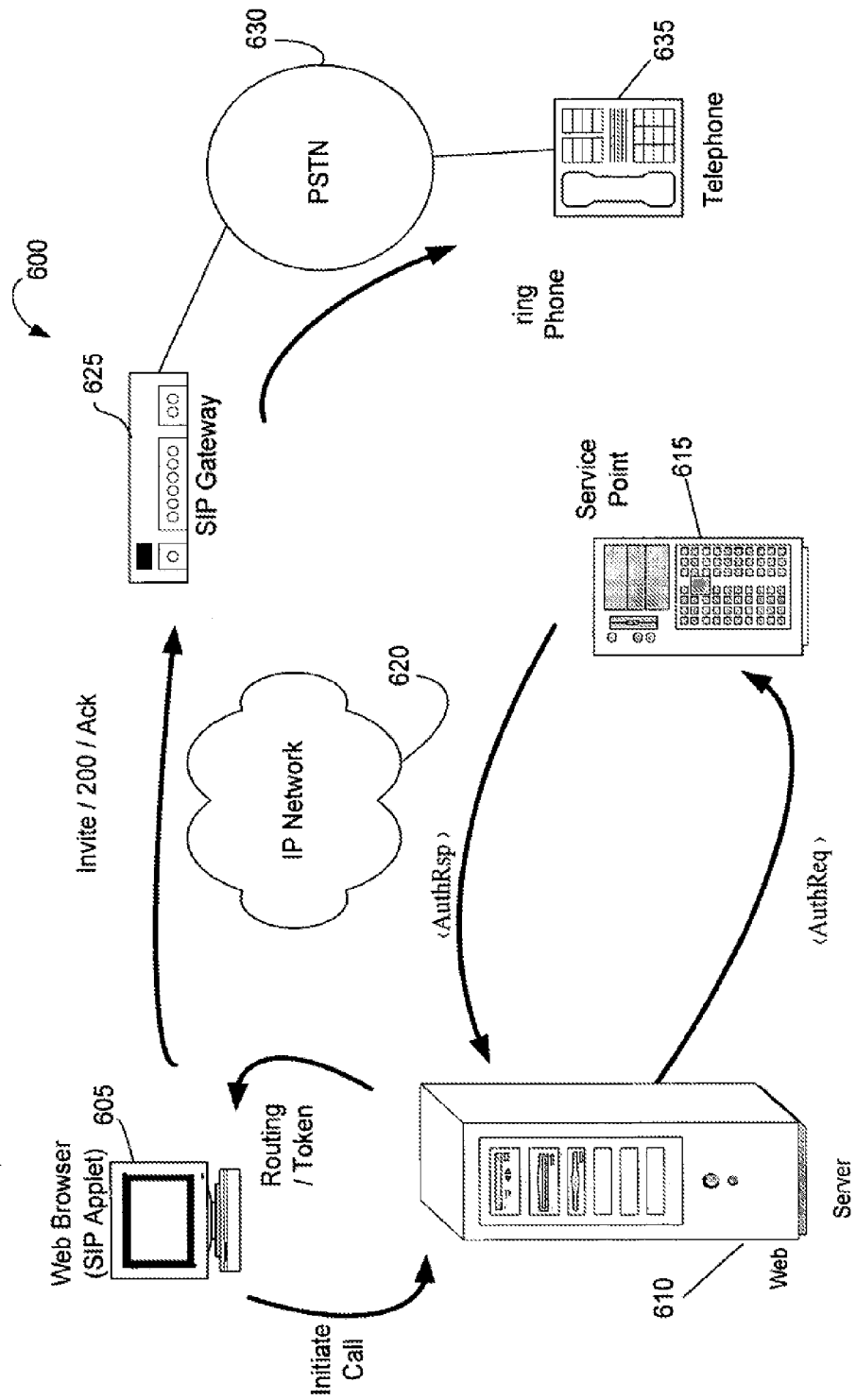
FIG. 6 is a block diagram illustrating a hybrid proxy/direct architecture for a clearinghouse service in an IP telephony system constructed in accordance with an exemplary embodiment of the present invention.

FIG. 6 illustrates how a web-based application can take advantage of the hybrid model. The application program running on the end user device (which, can be implemented as a Java or ActiveX applet implementing the Session Initiation Protocol) initiates the call by contacting a web server. The web server, acting as a proxy, performs the authorization exchange with a clearinghouse service point. It passes the resulting call routing information, along with the authorization token, back to the applet at the end user's device. The end user's PC or web-enabled device contacts the terminating gateway directly.

Because the end user receives routing and authorization from a web server, the end user is forced to visit the web site for each call. As a tool for enhancing "stickiness," the entire application may be positioned as a service for web sites (especially portals) more than for end users. Also, effective integration with other features of the web site (e.g. contact managers) may allow convenience to overcome some of the objections based on the relatively poor quality of the personal computer multimedia experience.

The requirements for a hybrid architecture include the existence of appropriate interoperable proxies (e.g., devices that can communicate with clients and with clearinghouse services) and end user devices that are directly interoperable with terminating gateways. It may also be the case in this approach that the proxy server cannot return an accurate usage report. If that is true, then the clearinghouse service operator must rely strictly on the terminating gateway's usage details.

FIG. 6 is a block diagram illustrating the exemplary architecture for a hybrid proxy/direct communication architecture for a clearinghouse service in an Internet telephony system. Turning now to FIG. 6, the hybrid proxy/direct communication architecture includes aspects of the proxy server model illustrated in FIG. 2 and the direct communication model illustrated in FIG. 4. For the hybrid proxy/direct communication architecture 600, a web-enabled device 605, a web server 610, a service point 615 and one or more terminating gateways 625 are coupled to an IP network 620.

The web-enabled device 605 can initiate a call by transmitting a call request to the web server 610. In response, the web server 610 completes call authorization tasks with the service point 615 via the IP network 620. The service point 615 maintains the clearinghouse service and is responsible for identifying available terminating gateways to accept an incoming call and to authorize call operations supported by the web browser 610 and the web-enabled device 605. For a verified call communication, the web server 610 can respond to the authorization response issued by the service point 615 by transmitting call routing the information and an authorization token to the web-enabled device 605. The web-enabled device 605 can complete call set-up operations with an identified terminating gateway 625 via the IP network 620. In response to the completion of set-up operations, the selected terminating gateway 625 can process the call for delivery to the called party at the telephone handset 635 via the PSTN 630.

Figure 7:
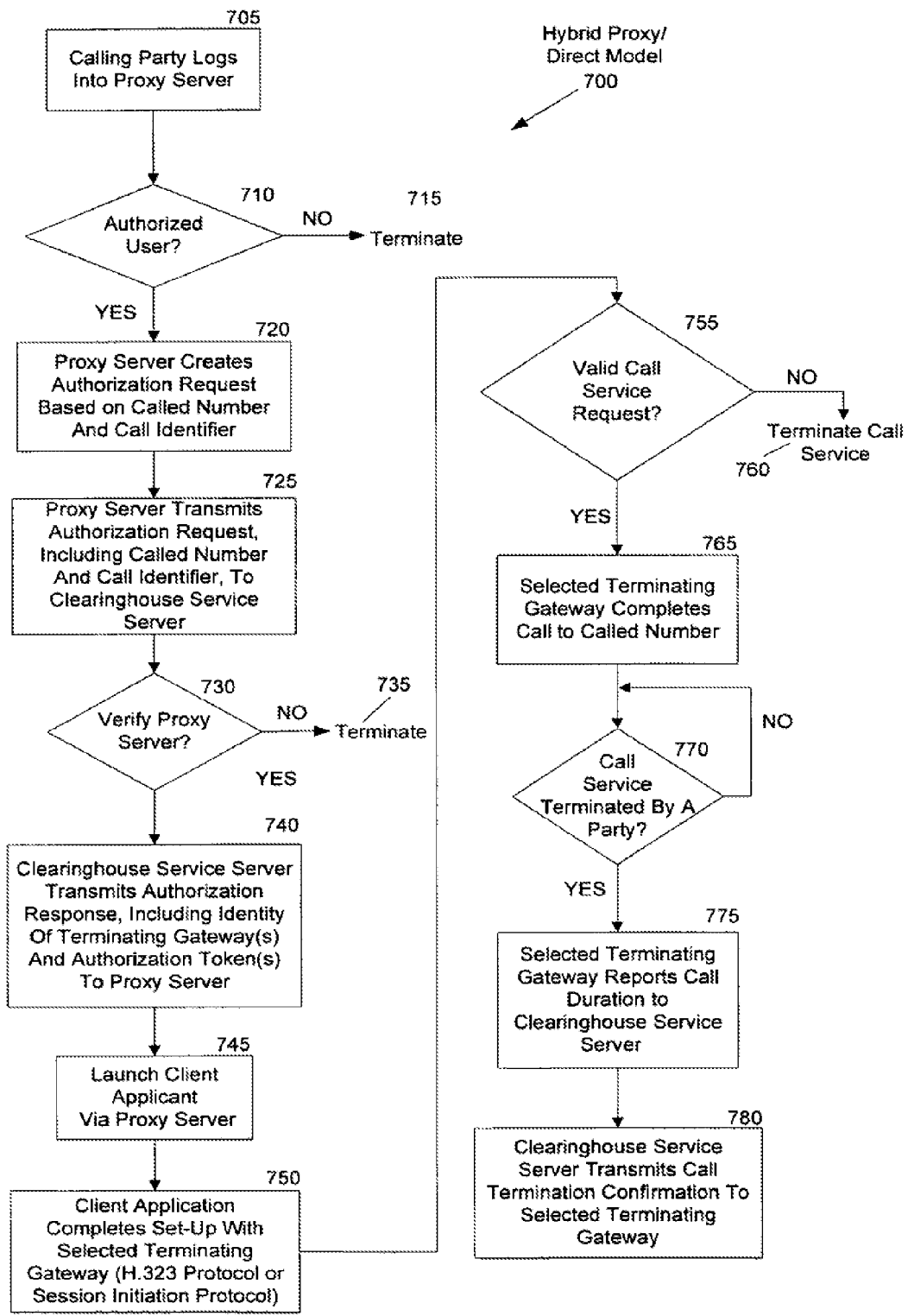
FIG. 7 a logical flow chart diagram illustrating the computer-implemented steps for a hybrid proxy/direct communication process for a clearinghouse service in an IP telephony system in accordance with an exemplary embodiment of the present invention.

FIG. 7 is a logical flow chart diagram illustrating the exemplary tasks of a hybrid proxy/direct communication process for a clearinghouse service in an Internet telephony system. Turning now to the exemplary task of the hybrid proxy/direct communication process 700, a calling party can log into a proxy server via a web-enabled device. The proxy server is typically implemented by a Web server coupled to the IP network. In step 710, inquiry is conducted by the proxy server to determine whether the user of the web-enabled device is authorized to access the call-related services maintained at the proxy server. If the response to this inquiry is negative, the "NO" branch is followed from step 710 to step 715 and the process is terminated. If the user is authorized to access services at the proxy server, the "YES" branch is followed from step 710 to step 720. The proxy server creates in step 720 an authorization request based upon a telephone number to be called and a call identifier. The called number is supplied by the calling party during the log-in task completed in step 705.

In step 725, the proxy server transmits the authorization request to the clearinghouse service server. The clearinghouse service server responds in step 730 by determining whether the proxy server is valid and authorized to access the clearinghouse services maintained by the service point. The authorization request issued in step 720 by the proxy server is the first indication received by the clearinghouse service that a party desires to initiate a call via the IP network. Consequently, there is a need at the service point to securely identify the proxy server as a valid user of the clearinghouse services for processing the call-related information provided by the proxy server. If the clearinghouse service cannot verify that the proxy server is a valid user of its services, the call is terminated at step 735. If the response to the inquiry in step 730 is positive, the clearinghouse service server transmits to the proxy server in step 740 the identity of one or more available terminating gateways and an authorization token for each identified gateway. This authorization response typically comprises a list of IP addresses for the available terminating gateways and an authorization token for processing each identified terminating gateway.

In step 745, the proxy server launches a client application at the web-enabled device. The Web server can accomplish the launching of the client application by dynamically constructing a Web page to launch the client. For example, the "Call to: URL" command can be used to create a link to a selected terminating gateway. The "Call to: URL" command can be used with Microsoft's "NET MEETING" protocol to create the link and to provide the authorization token and the call identifier to the client application. The user at the Web-enabled device can launch the client application by "clicking" or otherwise selecting the link to the selected terminating gateway.

In step 750, the client application at the web-enabled device can complete call set-up operations with the identified terminating gateway. The typical H.323 set-up operation includes the transmission of a call identifier, an authorization token, and a called number to the selected terminating gateway via the IP network. This set-up request can be formatted to comply with the H.323 protocol or the SIP protocol.

In step 755, the selected terminating gateway conducts an inquiry to determine whether the set-up request issued by the client application represents a valid call service request. The terminating gateway typically validates the client application by determining whether the authorization token has been issued by a known and valid clearinghouse service and is within the expiration period. In addition, the selected terminating gateway can compare the called number and the call identifier to information encoded within the authorization token to determine whether a match exists for a valid client application. If the response to the inquiry in step 755 is negative, the "NO" branch is followed from step 755 to step 760 and the call is terminated. If the selected terminating gateway verifies that the call service request has been issued by a valid client application, the "YES" branch is followed to step 765.

In step 765, the selected terminating gateway completes the call to the called number via the PSTN.

In step 770, the selected terminating gateway monitors the completed call to determine whether a call service has been terminated by a party to the call. If the response to this monitoring task is negative, the "NO" loop is followed back to step 770 to continue monitoring operations. If, on the other hand, the call has been terminated, the selected terminating gateway can report the call duration to the clearinghouse service server via the IP network in step 775. In turn, the clearinghouse service server, can transmit a call termination confirmation in step 780 to the selected terminating gateway.

In view of the foregoing, it will be understood that the present invention provides clearinghouse services architectures that support the use of end user devices, such as personal computers, IP phones, cable multimedia terminal adapters, and residential gateways, in an Internet telephony system. A user can operate an "intelligent" end user device. i.e., a device running a client program with knowledge of the architecture particulars, to access a clearinghouse service on an IP network. This enables the user to communicate a telephony call over the IP network and via the combination of a terminating gateway identified by the clearinghouse service and the PSTN. Significantly, the use of an intelligent end user device means that the user does not require direct access to architecture information necessary to communicate with the clearinghouse service; this information is maintained at the client application or a proxy. In addition, the present invention includes the forwarding of an authorization token to a selected terminating gateway by either a client application or a proxy. This authorization token provides an advantageous method for securely verifying that the contacting entity is a valid user of the clearinghouse service. The present invention supports three innovative architectures, namely a proxy-based system model, a direct communication model, and a hybrid proxy/direct communication model.

I claim:

1. A computer-implemented method for providing clearinghouse services to a client device in an Internet Protocol (IP) telephony system, comprising the steps of:

transmitting an authorization request from a proxy server to a clearinghouse service, the clearinghouse service being accessible by the proxy server;

transmitting an authorization response from the service point to the proxy, the authorization response comprising the identity of at least one terminating gateway available to complete the IP telephony communication session, and an electronic authorization token generated by the clearinghouse service for each identified terminating gateway, each terminating gateway operating independently such that the proxy server may gain access to a terminating gateway with the electronic authorization token; and selecting a terminating gateway with the proxy server to complete the IP telephony communication session.

2. The method of claim 1, further comprising transmitting an IP telephony communication session set-up request for an IP telephony communication session to the proxy server.

3. The method of claim 2, wherein transmitting an IP telephony communication session set-up request for an IP telephony communication session to a proxy server further comprises transmitting the set-up request from a client application operating on the client device, the client device and the proxy server coupled to an IP network.

4. The method of claim 1, further comprising running the clearinghouse service on a service point coupled to an IP network.

5. The method of claim 4, further comprising generating an authorization response with the clearinghouse service running on the service point.

6. The method of claim 1, wherein transmitting the authorization response further comprises transmitting the authorization response from a service point to the proxy server via an IP network.

7. The method of claim 1, further comprising coupling the gateways coupled to an IP network.

8. The method of claim 2, transmitting via the proxy server the communication session set-up request to the selected terminating gateway via an IP network.

9. The method of claim 2, wherein the communication session set-up request comprises an electronic authorization token.

10. The method of claim 1, further comprising establishing the IP telephony communication session via the selected terminating gateway with the Public Switched Telephone Network (PSTN).

11. The method of claim 1, further comprising receiving user authentication information, wherein the user authentication information comprises a pass-word.

12. The method of claim 1, further comprising receiving user authentication information, wherein the user authentication information comprises payment information.

13. The method of claim 2, further comprising terminating the call set-up request if the client application is not a valid user of the services maintained at the proxy server.

14. The method of claim 1, further comprising determining if the proxy server is a valid user of the call delivery services of the selected terminating gateway and determining if an authorization token has been issued by a known and valid clearinghouse service.

15. A system for providing clearinghouse services to a client device, comprising:
    an IP telephony network;
    a proxy server;
    a service point;
    one or more gateways;
    a Public Switched Telephone Network (PSTN); and
    a client device for transmitting an authorization request to a clearinghouse service, the clearinghouse service being accessible by the proxy server; the service point operable for generating and transmitting an authorization response to the proxy server, the authorization response comprising the identity of at least one terminating gateway coupled to the IP network and available to complete an IP telephony communication session, and an electronic authorization token generated by the clearinghouse service for each identified terminating gateway, each terminating gateway operating independently such that the proxy server may gain access to a terminating gateway with the electronic authorization token.

16. The system of claim 15, wherein the client device is operable for transmitting an IP telephony communication session set-up request to the proxy server.

17. The system of claim 15, wherein the client device and the proxy server are coupled to the IP telephony network.

18. The system of claim 16, wherein the client device transmitting the IP telephony communication session set-up request to the proxy server originates from a client application running on the client device.

19. The system of claim 15, wherein the clearinghouse service is provided by the service point.

20. The system of claim 15, wherein an IP telephony communication session is established via the at least one terminating gateway which is coupled to the Public Switched Telephone Network (PSTN).

\* \* \* \* \*